Sept. 19, 1967   L. H. BARNETT ETAL   3,341,896
MOLDING MECHANISM AND METHOD
Filed Nov. 12, 1963
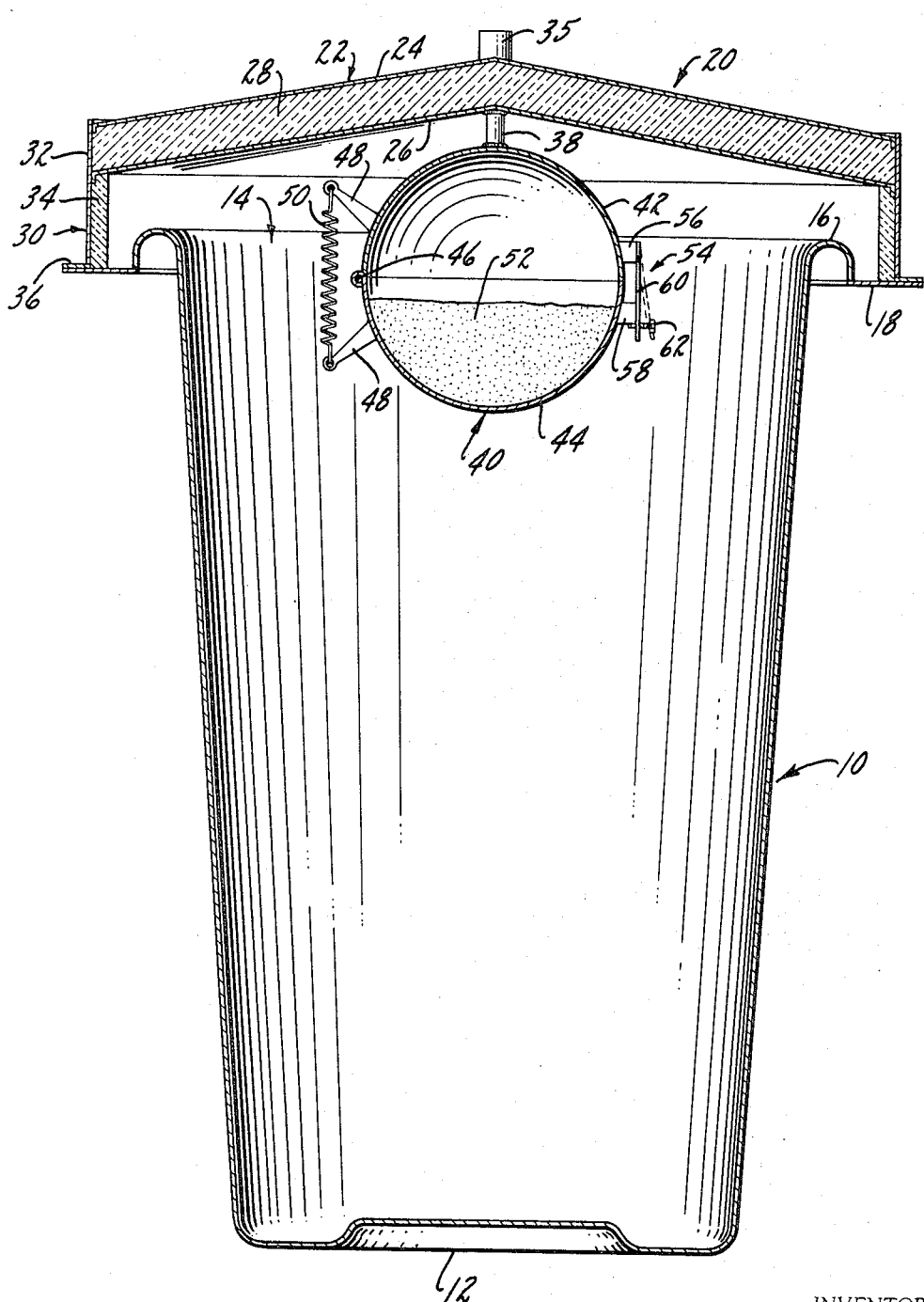
INVENTORS.
LOUIS H. BARNETT
HENRY P. HORTON
BY Parker & Carter
Attorneys.

United States Patent Office 3,341,896
Patented Sept. 19, 1967

3,341,896
MOLDING MECHANISM AND METHOD
Louis H. Barnett and Henry P. Horton, Fort Worth, Tex., assignors, by mesne assignments, to Loma Industries, Inc., Cleveland, Ohio, a corporation of Ohio
Filed Nov. 12, 1963, Ser. No. 322,909
4 Claims. (Cl. 18—26)

This invention relates to a plastic molding method and to a mold mechanism for use therein.

A primary purpose of the invention is a plastic molding method utilizing two different charges of plastic molding material, in which one charge is held within the mold during the molding operations and automatically released when the first charge has fused into the shape of the mold.

Another purpose is a plastic molding method of the type described in which two different batches of plastic molding material, of different colors, are utilized, the second color being automatically released for fusion to the first color when the mold reaches a predetermined temperature.

Another purpose is a mold mechanism including a mold body having an opening and a cover for the opening, and a normally closed container positioned within the mold and means for automatically opening the container.

Another purpose is a mold mechanism of the type described including a temperature operated release for a container positioned within the mold.

Another purpose is a molding method for forming a hollow article with one color on the outside and a second color on the inside, which method includes the step of releasing the molding material for the inside of the article from within the mold while the mold is being rotated and heated.

Other purposes will appear in the ensuing specification, drawings and claims.

The invention is illustrated diagrammatically in the attached axial section through a mold mechanism of the type described.

The mold mechanism shown and described herein may be used in a rotating molding apparatus. The mold may be rotated about a single axis or may be rotated about mutually perpendicular axes. The invention should not be limited to any particular type of mold rotating means nor to any particular arrangement for heating the mold as it rotates.

The type of molding material used in forming articles with the present mold may vary widely. Thermoplastic and thermosetting resins, normally in a powder form, are satisfactory. The invention should not be limited to these materials as there are many plastic molding materials which are practical.

The mold mechanism may include a mold body indicated generally at 10. In the form shown herein the mold body may be somewhat frusto-conical in shape having a closed bottom 12 and an open upper end 14. The size and shape of the mold body may vary widely depending upon the type of article being molded. In general, the present invention is suitable for use in molding hollow plastic articles. The upper open end of the mold body may include a rounded upper edge 16 which terminates in an outstanding annular flange 18.

Positioned to cover the upper open end of the mold body is a somewhat conical cover indicated generally at 20 which includes an insulated top 22 formed by spaced walls 24 and 26 and an intermediate layer of insulation 28. The cover and mold body may generally conform to the shape of the article being molded. Depending downwardly from the top 22 is a generally vertical flange 30 formed by an outer plate 32 and an inner layer of insulation 34. Extending outwardly from the vertical flange 30 is an annular flange 36 which seats on top of the flange 18 of the mold body. The cover 20 completely closes the upper end of the mold body and may have a stem or the like 35 extending outwardly from its center for use in mounting the mold in a mold rotating apparatus. A similar stem may be fixed to the bottom of the mold body.

Within the mold body and fixed to the cover 20 by a brace or the like 38 is a container 40, formed of an insulating material, and which may take a variety of forms, but as shown herein, is formed by an upper hemisphere 42 and a lower hemisphere 44. The upper hemisphere 42 is fixed to the brace 38 and the lower hemisphere 44 is hinged to the upper hemisphere 42, as at 46. Each of the hemispheres has an outstanding arm 48, with the arms being connected together by a coil spring or the like 50. The spring 50 yieldingly urges the lower hemisphere 44 toward an open position so that a charge of molding material 52 in the container 40 may be released within the mold.

A latch for holding the container sections 42 and 44 in a closed position is indicated generally at 54. The latch may include a bracket 56 fixed to the upper hemisphere 42 and a bracket 58 fixed to the lower hemisphere 44. A bimetallic strip 60 is fixed to the bracket 56 and has a screw or some other suitable latch member 62 mounted near its lower end. The screw 62 is positioned, relative to the bracket 58, such that it will clamp the two container sections tightly together when strip 60 is in the full line position. As the bimetallic strip is heated, it will bend outwardly, as indicated by the dotted line position, to release the lower section 44 to dump the charge of material 52 into the mold body. The bimetallic strip 60 may be formed of any suitable combination of metals having different thermal coefficients of expansion. The layer of metal closest to the container will have a greater coefficient of expansion than the layer of metal on the outside.

The use, operation and function of the invention are as follows:

In using the mold mechanism shown, a suitable batch or charge of molding material, for example a fine powder of a thermosetting or thermoplastic resin, will be introduced into the mold body. A second charge of material will be placed in the container 40. In many applications the material placed within the mold body 10 will be one color and the material placed in the container 40 will be a second color. Not only may there be two different colors but the materials may be different. The mold will then be heated and rotated either about one axis or about mutually perpendicular axes. Rotation and heat will cause the charge of material within the mold body to fuse along the wall of the mold body to form a hollow article of the desired shape. The bimetallic strip 60 is so constructed that when the temperature of the mold reaches a predetermined level, which is the temperature at which the first charge of material has fused together, the strip 60 will release the lower section of the container to dump the second charge of material into the mold body. The mold will continue to rotate and be heated and the second charge of material will then form the inner wall of the article.

Of particular advantage in the method described is that the dumping of the second charge of material is completely automatic. Heating and rotating of the mold is continuous during the entire operation.

The invention should not be limited to a bimetallic strip for automatically opening the container, nor to a temperature actuated latch. The container may be opened by a simple timing mechanism, either self-contained within the mold, or controlled from the outside by wires entering through the mold supports. Any type of release for the container, either hydraulic, air actuated, heat operated or otherwise, is satisfactory as what is important is to provide some means of releasing a charge of molding material at a predetermined time interval or after the temperature of the mold has reached a predetermined point. Normally the time interval and the temperature within the mold will coincide such that the first charge of molding material will have completely fused to the wall of the mold. A centrifically operated mechanism is also satisfactory. The container may be opened momentarily so that a measured shot of molding material will be dropped. Also, a membrane which will rupture when heated may be used to close the container holding the charge of molding material.

The invention need not be limited to any particular size or type of container, either fixed to the mold cover or to the mold body. In some applications it may be desirable to place a suitable charge of molding material within a dissolvable capsule or plastic sack and this capsule sack freely placed within the mold. When the temperature of the molding apparatus reaches a predetermined point, the heat will dissolve the outer container and release the inner charge of molding material.

Various types of molded articles can be formed with the method and apparatus described. Garbage cans, waste baskets, or any type of hollow article may be satisfactorily molded. An expensive coating can be fused to a rather inexpensive outer shell.

Whereas the preferred form of the invention has been shown and described herein, it should be realized that there are many modifications, substitutions and alterations thereto within the scope of the following claims.

We claim:

1. In a mold for forming a hollow plastic article, a mold body having an open end, a cover for said open end, a container for holding a charge of molding material fixed to said cover and extending within said mold body, said container including a pair of releasable sections yieldingly urged toward an open position, and a temperature actuated latch holding said sections in a closed position and arranged to release said sections when the temperature in the mold reaches a predetermined level.

2. The structure of claim 1 further characterized in that said temperature operated latch includes a bimetallic strip.

3. A mold for forming a hollow plastic article comprising:
    (a) a mold body having an opening;
    (b) a cover for said opening;
    (c) a container releasably confining a charge of molding material positioned within the mold;
    (d) latch means for opening said container;
    (e) said container comprising at least two sections and at least one section is pivotably mounted so as to realse said molding material.

4. The mold of claim 3 wherein said latch means is temperature actuated.

References Cited

UNITED STATES PATENTS 2,466,277    4/1949    Rubissow _____ 18—26 X
3,202,745    8/1965    Ringdal _____ 18—26 X WILLIAM J. STEPHENSON, *Primary Examiner.*